(12) United States Patent
Rakhmailov

(10) Patent No.: US 6,212,871 B1
(45) Date of Patent: Apr. 10, 2001

(54) METHOD OF OPERATION OF A GAS TURBINE ENGINE AND A GAS TURBINE ENGINE

(75) Inventor: Anatoly Rakhmailov, Bataysk (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/267,897

(22) Filed: Mar. 11, 1999

(51) Int. Cl.[7] .............................. F02B 43/00; F02C 1/06; F02C 7/10; F02C 7/08

(52) U.S. Cl. .................. 60/39.02; 60/39.12; 60/39.24; 60/39.162; 60/39.511; 60/39.52

(58) Field of Search ................. 60/39.02, 39.03, 60/39.04, 39.12, 39.2, 39.24, 39.162, 39.22, 39.41, 39.511, 39.52, 653

(56) References Cited

U.S. PATENT DOCUMENTS

| | | |
|---|---|---|
| 1,388,707 | 8/1921 | Heinze . |
| 1,868,143 | 7/1932 | Heinz . |
| 2,303,381 | 12/1942 | New . |
| 2,579,049 | 12/1951 | Price . |
| 2,784,551 | 3/1957 | Karlby et al. . |
| 2,821,067 | 8/1958 | Tartaglia . |
| 2,823,520 | 2/1958 | Spalding . |
| 3,280,555 | 10/1966 | Charpentier et al. . |
| 3,287,904 | 11/1966 | Warren et al. . |
| 3,469,396 | 9/1969 | Onishi et al. . |
| 3,727,401 | 4/1973 | Fincher . |
| 3,751,911 | 8/1973 | De Tartaglia . |
| 3,775,974 | 12/1973 | Silver . |
| 3,826,084 | 7/1974 | Branstrom et al. . |
| 3,886,732 | 6/1975 | Gamell . |
| 3,971,209 | 7/1976 | de Chair . |
| 4,024,705 | 5/1977 | Hedrick . |
| 4,084,922 | 4/1978 | Glenn . |
| 4,142,836 | 3/1979 | Glenn . |
| 4,277,938 | 7/1981 | Belke et al. . |
| 4,338,780 | 7/1982 | Sakamoto et al. . |
| 4,338,781 | 7/1982 | Belke et al. . |
| 4,433,540 | * 2/1984 | Cornelius et al. ............ 60/39.511 |

(List continued on next page.)

FOREIGN PATENT DOCUMENTS

| | | |
|---|---|---|
| 77 09399 | * 10/1998 | (FR) . |
| 196452 | 4/1923 | (GB) . |
| 753652 | 7/1956 | (GB) . |
| 801281 | 9/1958 | (GB) . |
| 803994 | 11/1958 | (GB) . |
| 2332698 | 1/1974 | (GB) . |
| 2335594 | 8/1974 | (GB) . |
| 2437990 | 2/1976 | (GB) . |
| 1435687 | 5/1976 | (GB) . |
| 2018641 | 10/1991 | (GB) . |
| 1744290 | * 6/1992 | (GB) . |

*Primary Examiner*—Charles G. Freay
(74) *Attorney, Agent, or Firm*—Hughes Hubbard & Reed LLP; Ronald Abramson; Peter A. Sullivan

(57) ABSTRACT

A gas turbine engine that has a turbine (1) mounted downstream of a combustor (5), a compressor turbine (2) mounted downstream of turbine (1) for producing power for driving a compressor (3), a heat exchanger (6) having a first circuit ($6^1$) connected to compressor turbine (2) and a second circuit ($6^2$) connected between compressor (2) and turbine (1) and a fluid discharge device (7) between compressor (3) and combustor (5). The gas turbine engine has a reactor (8) that has a heating device (9), inlets (F, W) connected to sources of fuel and water and an outlet connected to combustor (5). Heating device (9) is connected the outlet of compressor turbine (2). The engine also has a system for keeping the temperature at the outlet of compressor turbine (2) constant.

8 Claims, 2 Drawing Sheets

U.S. PATENT DOCUMENTS

| | | |
|---|---|---|
| 4,501,053 | 2/1985 | Craig et al. . |
| 4,549,402 | 10/1985 | Saintsbury et al. . |
| 4,817,858 | 4/1989 | Verpoort . |
| 4,991,391 | 2/1991 | Kosinski . |
| 5,054,279 | 10/1991 | Hines . |
| 5,193,337 * | 3/1993 | Harboe et al. ............... 60/39.03 |
| 5,255,507 * | 10/1993 | Gounder et al. ............... 60/39.12 |
| 5,473,881 | 12/1995 | Kramnik et al. . |
| 5,819,522 * | 10/1998 | Topsoe ............... 60/39.02 |
| 5,934,065 * | 8/1999 | Bronicki et al. ............... 60/39.181 |

* cited by examiner

METHOD OF OPERATION OF A GAS TURBINE ENGINE AND A GAS TURBINE ENGINE

The invention relates to the field of gas turbine engines, and more specifically, to gas turbines using an adjustable load feedback mechanism to control engine operating parameters.

BACKGROUND OF THE INVENTION

This invention concerns variable speed gas turbine engines of a type that can be especially useful for driving electric generators or vehicles and in other applications where it is preferred to have a moderate power output, small size and high response speed. The efficiencies of variable speed turbines vary according to a number of variables, including engine speed. In prior art gas turbines of this type, when the turbine speed decreases and the power output remains unchanged, such as in the case of where a vehicle travels up a slope, the compressor speed will rise, its power will increase, and much more fluid than necessary will be supplied to the turbine. The engine consequently becomes "overcooled", the cycle temperature drops, and contraction of metal parts occurs. As a result, turbine power output decreases, and efficiency is reduced.

When turbine speed remains unchanged, and the power output decreases, such as in the case of where a vehicle travels down a slope, compressor speed decreases to a great extent and the turbine experiences a shortage of fluid. The engine thus becomes "overheated," which poses risks to turbine engine components due to excessive metal expansion.

During overcooling, the compressor turbine has an excess of power that floods the turbine with fluid. During overheating, there is a shortage of power at the compressor turbine, and the turbine receives less fluid than it needs, which leads to overheating. Thus, temperature is a critical parameter to control in engines of this type. Both phenomena can be counteracted by controlling fluid flow to the compressor turbine or by controlling fluid flow to the turbine. In both cases, such control is accompanied by losses.

In our pending application Ser. No. 09/161,170, filed Sep. 25, 1998, I disclose a gas turbine engine having a turbine mounted downstream of a compressor and a compressor turbine mounted downstream of the turbine for driving the compressor. The compressor turbine has a rotor disk that is mechanically coupled to the compressor and rotates in a direction opposite to the direction of rotation of the turbine rotor disk. A heat exchanger has a first circuit connected to the compressor turbine and a second circuit connected between the compressor and the turbine. An electric load for consuming a fraction of power produced by the compressor turbine includes an electric generator that is mechanically coupled to the compressor turbine. The electric load controller varies the electric load consumed based on temperature reading from the engine, thus changing the amount of power produced by the compressor turbine. This load is varied in response to changes in temperature and other operating characteristics in order to hold such characteristics within desired ranges. The above-described system allows the temperature at the exhaust of the compressor turbine to be kept stable. The stable temperature at the exhaust assures stable operating parameters and temperature conditions in the flow duct of the gas turbine engine. This enhances efficiency and reliability of the gas turbine engine and prolongs service life. However, the temperature in the combustor is about 1900K. It should be noted that formation of nitrogen oxides during fuel combustion starts from 1800K. Nitrogen oxide emissions are very harmful, and are subject to strict control in many jurisdictions. Further, to control CO levels, emissions of which are also of environmental concern, it would be desirable to have a maximum combustor temperature of 1500K. To achieve this, a very lean fuel and air mixture must be used, with an excess air factor of about 2.2. This is practically unachievable.

This emissions problem was addressed in a gas turbine engine (Electric Vehicles, PT58, 1997, Ed. By Ron Sims and Bradford Bates, Society of Automotive Engineers, Inc., Warrendale, Pa., p. 143–145) having a compressor, a turbine, a heat exchanger for heating air from the outlet of the compressor with the exhaust gases of the turbine before supplying the air to a combustor and a catalytic combustor. The catalytic combustor assures combustion of a very lean fuel and air mixture having an excess air factor of 6 to 8. Combustion with this excess air factor occurs at 1050 to 1100K, thus ruling out the formation of nitrogen oxides. The catalytic combustor is made as a catalytic thermochemical reactor containing a catalyst bed in a special screen casing and having a special heater for preheating the catalyst before starting the gas turbine engine. The reactors of this type require much space and have a complicated design. In addition, a certain time is required for heating the catalyst before starting the gas turbine engine. Another disadvantage of this gas turbine engine is contamination of the catalyst, which is aggravated when normal fuel containing sulfur and other impurities is used. As the catalyst becomes contaminated, its catalytic efficiency decreases, the combustion temperature rises, and the $NO_x$ level in emission also increases. It should be also added that catalysts are consumable materials and will add to the cost of operation of the gas turbine engine.

Another attempt to increase efficiency of a gas turbine engine with the use of a thermochemical reactor (Nosach N. G., Energiya topliva [in Russian] AN Ukr. SSR, Institut tekhnicheskoy teplofiziki. Kiev., Naukova Dumka, 1989, p. 78) involves mixing fuel with combustion products from the exhaust of the turbine after passing through a heat exchanger. The mixture of fuel with combustion products, which contain CO and water, is compressed in a special compressor and is then fed to a thermochemical reactor that is heated to about 900K with the exhaust gases from the turbine under normal operating conditions (full speed). The fuel and exhaust gases react in the thermochemical reactor and decompose into CO and hydrogen, the quantity of the combustible material increases, and the overall amount of energy available in the fuel increases by 40 to 44%. The resulting fuel from the thermochemical reactor is supplied to the combustor, which also receives air from a compressor of the gas turbine engine that is heated with the exhaust gases of the turbine. This cycle of the gas turbine engine should have resulted in an improved efficiency of the gas turbine engine. As the reaction of fuel conversion in the thermochemical reactor can occur only starting from the temperature of about 800K, this reaction cannot take place under low-power operating conditions of the gas turbine engine when the exhaust gas temperature can be as low as 500K. It should be also noted that a temperature of at least 1000K is required for the complete reaction to occur. In addition, there can be no oxygen in the mixture that is compressed in the special compressor before conversion in the thermochemical reactor. It is known that oxygen is always available in the combustion products (up to 10%). This oxygen will immediately oxidize the fuel in the compressor up to self ignition. As a result, a part of the combustible components of the fuel will be burned before reaching the thermochemical reactor. It will be understood that in a gas turbine engine that have to be used in vehicles or in electric generation sets operating under variable loads, this method cannot be used to the full advantage, and the desired increase in the overall efficiency cannot be assured. It should be also noted that the fuel obtained after conversion in the thermochemical reactor is burned in a conventional combustor with a combustion temperature of about 2200K, forming $NO_x$.

These disadvantages are eliminated in a gas turbine engine according to the invention as described below.

SUMMARY OF THE INVENTION

It is an object of the invention to provide a method of operation of a gas turbine engine and a gas turbine engine of the above-described type in which $NO_x$ and CO emissions are minimized.

Another object of the invention is to provide a gas turbine engine that has a greater overall efficiency.

The foregoing objects are accomplished through the design of a gas turbine engine that has a turbine mounted downstream of a combustor, a compressor turbine mounted downstream of turbine for producing power for driving a compressor, a heat exchanger having a first circuit connected to the compressor turbine and a second circuit connected between the compressor turbine and a fluid discharge device between the compressor and combustor. The gas turbine engine has a reactor having a heating device, an inlet connected to sources of fuel and water and an outlet connected to the combustor. The heating device is connected to the outlet of compressor turbine. The engine also has a system for keeping the temperature at the outlet of compressor turbine constant.

Other objects and advantages of the invention will become apparent from the following detailed description of preferred embodiments thereof and the accompanying drawings.

DETAILED DESCRIPTION OF THE DRAWINGS

Figure 1:
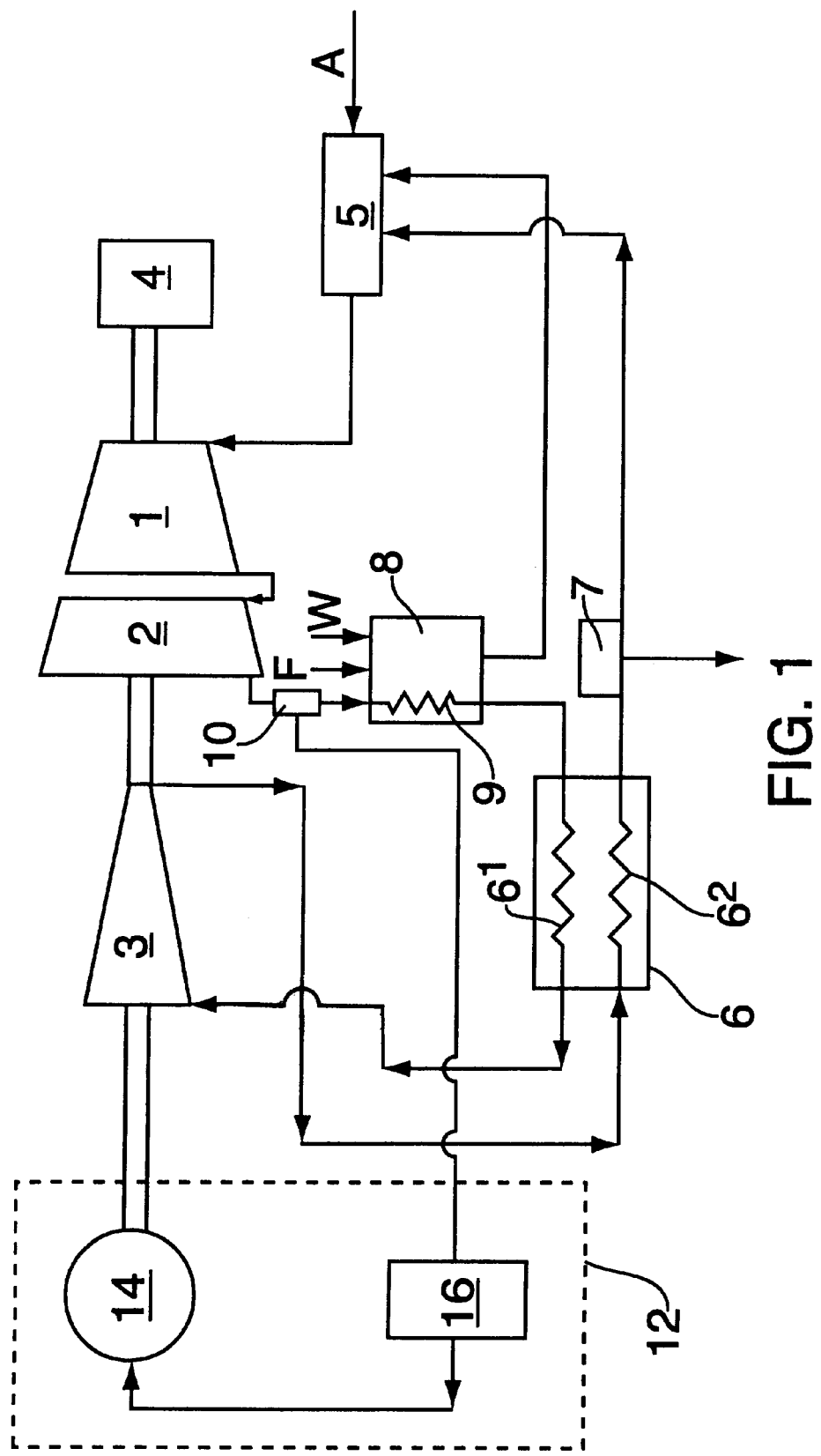
FIG. 1 is a schematic view of a gas turbine engine according to the invention.

As shown in FIG. 1, a gas turbine engine has a turbine 1, a compressor turbine 2 that is mounted downstream of turbine 1 for rotation in the direction opposite to the direction of rotation of turbine 1, a compressor 3 mounted for rotation together with compressor turbine 2. Turbine 1 has a load 4 powered by turbine 1. A combustor 5 provided upstream turbine 1 is designed to prepare a heated fluid for turbine 1 by combustion with air that may be supplied to combustor as shown by arrow A. The gas turbine engine has a heat exchanger generally shown at 6. The heat exchanger has a first circuit $6^1$ provided between the outlet of compressor turbine 2 and the inlet of compressor 3 and a second circuit $6^2$ provided between turbine 1 and the outlet of compressor 3. The function of the heat exchanger is to cool down the fluid that comes from compressor turbine 2 to compressor 3 (in circuit $6^1$) and to use this heat for heating the fluid that passes from compressor 3 to turbine 1 (in circuit $6^2$). It is understood that heat exchanger 6 can have other circuits and devices for additional heat exchange depending on specific operating conditions and requirements of the various components of the gas turbine engine. A device 7 is provided for discharging a part of fluid from the flow duct of the gas turbine engine between compressor 3 and turbine 1. It is preferred that device 7 be provided between second circuit $6^2$ and combustor 5. Although device 7 does not have a material bearing on this invention, it can be noted that this device is used for controlling the density of fluid in the flow duct to control power of turbine 1. This device can be controlled manually or by means of special automatic control systems that do not make part of this invention. An example of such a system can be found disclosed in our pending application Ser. No. 09/161,114, filed Sep. 25, 1998.

The gas turbine engine according to the invention has a reactor 8 that has an inlet to which fuel and water are fed as shown by arrows F and W in FIG. 1 and an outlet connected to combustor 5. Reactor 8 has a heating device 9 (e.g., a coil) that is connected to the outlet of compressor turbine 2 for heating the fuel and water admitted to the reactor. As a result, the fuel that is heated within the reactor is converted into carbon monoxide and hydrogen and is fed to combustor 5 for combustion with air fed as shown by arrow A to form a heated fluid supplied to turbine 1 for expansion in turbine 1 for powering load 4 and for further expansion in compressor turbine 2 for powering compressor 3. Compressor 3 supplies compressed fluid, which is heated in circuit $6^2$ of heat exchanger 6, to combustor 5 and to turbine 1. Fluid from compressor turbine 2, after passing through reactor 8, is cooled within second circuit $6^1$ of heat exchanger 6 with compressed fluid coming from compressor 3 through first circuit $6^2$ and is admitted to compressor 3 for compression. This completes the cycle of the gas turbine engine.

The temperature at the outlet of compressor turbine 2 is kept constant. For this purpose, a temperature pickup 10 is provided upstream of heat exchanger 6. Temperature pickup 10 is connected to a temperature controller generally shown at 12. Temperature controller 12 has a variable load 14 connected to compressor turbine 2 to change the output of compressor 3 and a controller 16 that is used to control variable load 14. Controller 16 is connected to temperature pickup 10. As the temperature at the outlet of compressor turbine 2 depends on the output of compressor 3, this temperature will be effectively controlled by varying load 14 on compressor turbine 2. The most efficient way of doing this is to use an electric generator as the variable load, which can be connected to any electric load (such as storage batteries, electrical accessories, and the like) that is part of controller 16. The specific arrangement and operation of the variable load and its control do not have a material bearing on this invention and can be found disclosed in our pending application Ser. No. 09/161,170. It will be understood to those skilled in the art that the temperature at the outlet of compressor turbine 2 can be controlled by any other appropriate known means (such as by means of additional heat exchangers).

It will be apparent that the use of reactor 8 for conversion of fuel is made possible because there is a stable temperature of about 1200K at the outlet of compressor turbine 2. This means that the fuel that is fed to the reactor will be substantially completely converted into carbon monoxide and hydrogen. As the fuel conversion is conducted with water, the combustible components of the fuel will not be oxidized. The stable temperature of the reaction assures that the composition of the fuel supplied to combustor 5 remains unchanged, which enhances efficiency of the gas turbine engine. As the temperature of the converted fuel supplied to combustor 5 is about 1000K, the temperature in combustor 5 can be kept at about 1600K. This temperature can be at such a low level because the converted fuel can be burned with a greater excess air ratio of about 4 (compared to a maximum of 2 for conventional fuel). At the same time, this temperature in the combustor rules out formation of $NO_x$ and CO in emission.

Figure 2:
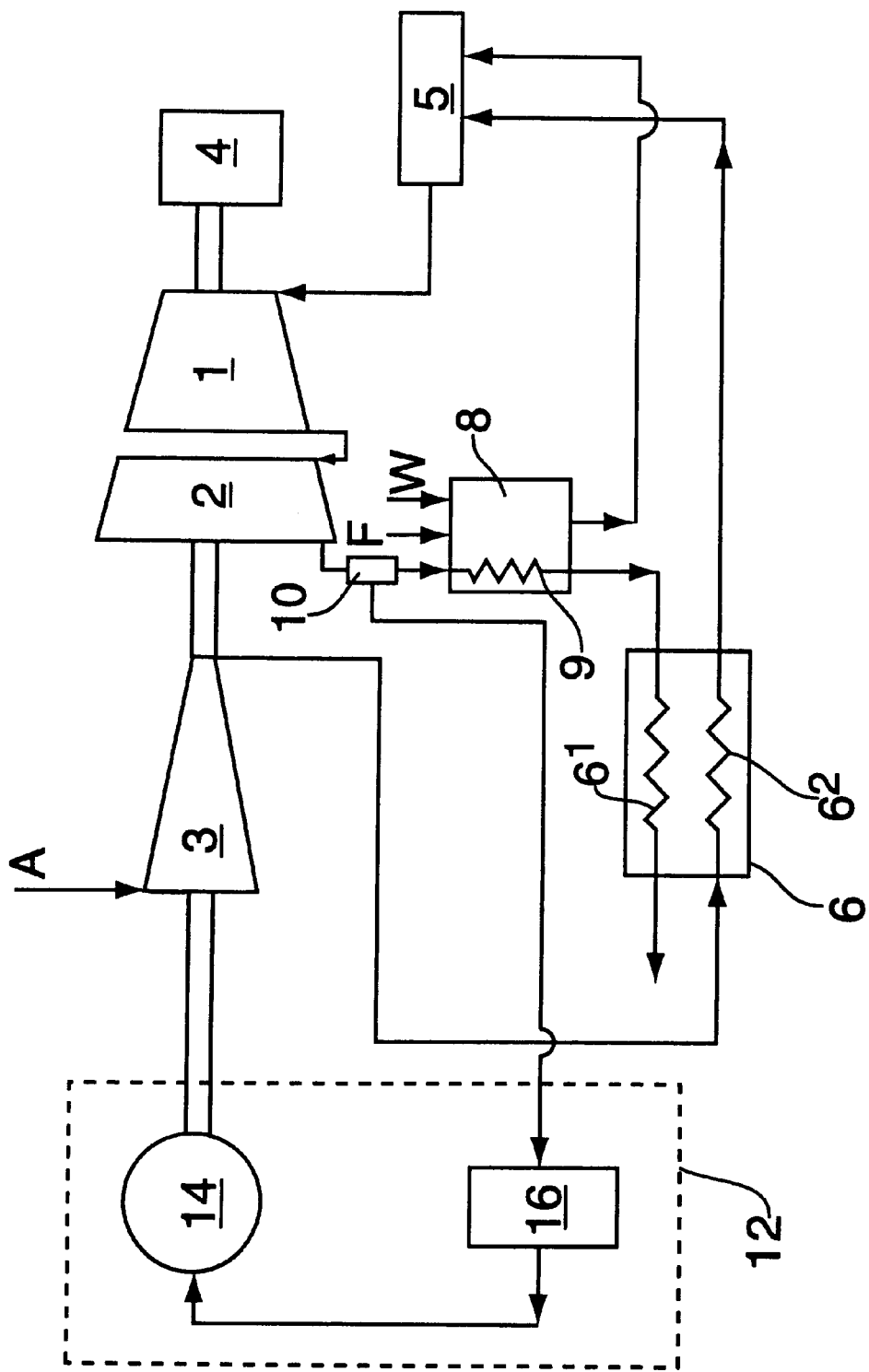
FIG. 2 is a schematic view of a second embodiment of a gas turbine engine according to the invention.

The embodiment of the gas turbine engine according to the invention shown in FIG. 2, in which similar parts are shown at the same reference numerals as in FIG. 1, is constructed and functions similarly to the embodiment shown in FIG. 1. The difference here resides in the fact that compressor 3 compresses air (shown at A) to supply it through circuit $6^2$ of heat exchanger 6 to combustor 5 and turbine 1, and fluid from compressor turbine 2 is discharged into the atmosphere from circuit $6^1$ of heat exchanger 6 after being used for heating the air from compressor 3.

It should be noted that reactor 8 for conversion of fuel can be made as a heat exchanger installed on, or incorporated into, an exhaust duct of compressor turbine 2. In this case, a separate heating device 9 is not required, and heat exchange can occur through the wall of the exhaust duct of compressor turbine 2.

The invention was described with reference to the preferred embodiments. Various changes and modifications can be made, however, without going beyond the spirit and scope of the invention as defined in the attached claims.

I claim:

1. A method of operation of a gas turbine engine, said method comprising:

compressing fluid in a compressor having an inlet and outlet to obtain a compressed fluid;

supplying said compressed fluid to a combustor for preparing a heated fluid through combustion with air supplied to said combustor;

expanding said heated fluid in a turbine and in a compressor turbine mounted downstream said turbine for rotation in the direction opposite to the direction of rotation of said turbine, said compressor turbine having an outlet that has a temperature;

cooling said heated fluid from said outlet of said compressor turbine to obtain a cooled fluid and supplying said cooled fluid to said compressor;

using said compressed fluid that is supplied to said combustor for cooling said heated fluid from said outlet of said compressor turbine and discharging a part of said compressed fluid that is supplied to said combustor;

keeping said temperature constant;

heating fuel and water with said heated fluid obtained at said outlet of said compressor turbine, whereby said fuel is converted to a mixture of carbon monoxide and hydrogen; and supplying said mixture of carbon monoxide and hydrogen to said combustor.

2. A method of operation of a gas turbine engine, said method comprising:

compressing air in a compress or to obtain a compressed air;

supplying said compressed air to a combustor for preparing a heated fluid through combustion;

expanding said heated fluid in a turbine and in a compressor turbine mounted downstream said turbine for rotation in the direction opposite to the direction of rotation of said turbine, said compressor turbine having an outlet that has a temperature;

heating said compressed air with said heated fluid from said outlet of said compressor turbine before supplying said compressed air to said combustor;

discharging said heated fluid from said outlet of said compressor turbine after said heating said compressed air;

keeping said temperature constant;

heating fuel and water with said heated fluid obtained at said outlet of said compressor turbine, whereby said fuel is converted to a mixture of carbon monoxide and hydrogen; and supplying said mixture of carbon monoxide and hydrogen to said combustor.

3. A gas turbine engine, said gas turbine engine comprising:

a compressor;

a combustor for preparing a heated fluid through combustion with air;

a turbine, said turbine being mounted downstream of said combustor;

a compressor turbine mounted downstream of said turbine for producing power for driving said compressor, said compressor turbine having an outlet that has a temperature, said compressor turbine being mechanically coupled to said compressor to transmit said power to said compressor, said compressor turbine rotating in a direction opposite to the direction of rotation of said turbine;

a heat exchanger having a first circuit connected to said compressor turbine and a second circuit connected between said compressor and said turbine;

a fluid discharge means, said fluid discharge means being provided between said compressor and said combustor;

a reactor, said reactor having a heating means, an inlet and an outlet, said inlet being connected to sources of fuel and water and said outlet being connected to said combustor;

said heating means being connected to said outlet of said compressor turbine; and means for keeping said temperature constant.

4. The gas turbine engine of claim 3, wherein said means for keeping said temperature constant comprises a temperature pickup and a temperature controller connected to said temperature pickup, said temperature pickup being provided upstream said heat exchanger.

5. The gas turbine engine of claim 3, wherein said means for keeping said temperature constant comprises a variable load of said compressor turbine, a controller controlling said variable load, and a temperature pickup, said temperature pickup being provided upstream said heat exchanger and being connected to said controller.

6. A gas turbine engine, said gas turbine engine comprising:

a compressor;

a combustor for preparing a heated fluid through combustion with air;

a turbine, said turbine being mounted downstream of said combustor;

a compressor turbine mounted downstream of said turbine for producing power for driving said compressor, said compressor turbine having an outlet that has a temperature, said compressor turbine being mechanically coupled to said compressor to transmit said power to said compressor, said compressor turbine rotating in a direction opposite to the direction of rotation of said turbine;

a heat exchanger having a first circuit connected to said compressor turbine and to the atmosphere and a second circuit connected between said compressor and said turbine;

a reactor, said reactor having a heating means, an inlet and an outlet, said inlet being connected to sources of fuel and water and said outlet being connected to said combustor;

said heating means being connected to said outlet of said compressor turbine; and means for keeping said temperature constant.

7. The gas turbine engine of claim 6, wherein said means for keeping said temperature constant comprises a temperature pickup and a temperature controller connected to said temperature pickup, said temperature pickup being provided upstream said heat exchanger.

8. The gas turbine engine of claim 6, wherein said means for keeping said temperature constant comprises a variable load of said compressor turbine, a controller controlling said variable load, and a temperature pickup, said temperature pickup being provided upstream said heat exchanger and being connected to said controller.

* * * * *